United States Patent
Brooks et al.

(10) Patent No.: US 11,462,038 B2
(45) Date of Patent: Oct. 4, 2022

(54) INTERPRETING TEXT CLASSIFICATION PREDICTIONS THROUGH DETERMINISTIC EXTRACTION OF PROMINENT N-GRAMS

(71) Applicant: International Business Machines Corporation, Armonk, NY (US)

(72) Inventors: Alexander Brooks, Denver, CO (US); Gaurav Kumbhat, Englewood, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 352 days.

(21) Appl. No.: 16/740,308

(22) Filed: Jan. 10, 2020

(65) Prior Publication Data
US 2021/0216762 A1    Jul. 15, 2021

(51) Int. Cl.
*G06V 30/40*      (2022.01)
*G06V 30/418*     (2022.01)
*G06F 40/20*      (2020.01)
*G06V 30/413*     (2022.01)
*G06F 40/30*      (2020.01)
*G06F 40/205*     (2020.01)
*G06V 30/414*     (2022.01)

(52) U.S. Cl.
CPC ......... *G06V 30/413* (2022.01); *G06F 40/205* (2020.01); *G06F 40/30* (2020.01); *G06V 30/414* (2022.01)

(58) Field of Classification Search
USPC ................ 382/100–105, 154–161, 224–230
See application file for complete search history.

(56) References Cited

U.S. PATENT DOCUMENTS

| | | | |
|---|---|---|---|
| 8,478,052 B1* | 7/2013 | Yee | G06V 10/464 707/E17.02 |
| 9,792,280 B2 | 10/2017 | Mueller et al. | |
| 10,133,738 B2 | 11/2018 | Huang | |
| 2006/0123000 A1* | 6/2006 | Baxter | G06F 16/30 707/999.005 |

(Continued)

FOREIGN PATENT DOCUMENTS

WO   WO-2017090051 A1 *   6/2017   ............. G06F 15/18

OTHER PUBLICATIONS

Cavnar et al., "N-Gram-Based Text Categorization" dated, Environmental Research Institute of Michigan, Total 14 pages.

(Continued)

*Primary Examiner* — Marcellus J Augustin
(74) *Attorney, Agent, or Firm* — Konrad Raynes Davda & Victor LLP; David W. Victor

(57) ABSTRACT

Provided are a computer program product, system, and method for interpreting text classification predictions through deterministic extraction of prominent n-grams. A determination is made of n-gram vectors comprising word embeddings of n-grams in a document and of a document vector comprising word embeddings of the document. A label is received from the text classifier program, comprising a text classification of the document. A determination is made of a label vector comprising word embeddings of the label. The n-gram vectors, the document vector, and the label vector are used to determine n-grams that explain the text classification of the text classifier program.

20 Claims, 3 Drawing Sheets

(56) References Cited

U.S. PATENT DOCUMENTS

| | | | | |
|---|---|---|---|---|
| 2012/0197825 A1* | 8/2012 | Medlock | ............... | G06F 3/0237 |
| | | | | 706/11 |
| 2012/0253792 A1* | 10/2012 | Bespalov | .............. | G06F 16/353 |
| | | | | 704/9 |
| 2015/0347383 A1 | 12/2015 | Willmore et al. | | |
| 2021/0034813 A1* | 2/2021 | Wu | ....................... | G06N 3/0454 |
| 2021/0174193 A1* | 6/2021 | Pouran Ben Veyseh | .................... | |
| | | | | G06N 3/0445 |
| 2022/0147717 A1* | 5/2022 | Jones, Jr. | .............. | G06F 40/289 |

OTHER PUBLICATIONS

Kumar et al., "Machine Learning Based Predictive Model for Analysing the Sentiments in Short Text" dated Oct. 10, 2014, An IP.com Prior Art Database Technical Disclosure for IP.com No. IPCOM000239081D, Total 10 pages.

Anonymous "Automatic Categorization of IT Infrastructure Service Management Data using Natural Language Processing and Machine Learning" dated Feb. 18, 2016, An IP.com Prior Art Database Technical Disclosure for IP.com No. IPCOM000245200D, Total 7 pages.

Anonymous, "Retrospective User Input Inference and Correction" dated Jan. 5, 2018, An IP.com Prior Art Database Technical Disclosure, for IP.com No. IPCOM000252365D, Total 38 pages.

Ogada "N-grams for Text Classication Using Supervised Machine Learning Algorithms" dated 2016, a thesis submitted in fulllment for the degree of Doctor of Philosophy in Information Technology in the Jomo Kenyatta University of Agriculture and Technology, Total 214 pages.

Ribeiro et al., "Why Should I Trust You? Explaining the Predictions of Any Classifier" dated 2016, Total 10 pages.

Singaraju, "Introduction to Embedding in Natural Language Processing" dated Jan. 31, 2019, (online) retrieved from the Internet at URL>https://blogs.oracle.com/datascience/introduction-to-embedding-in-natura . . . , Total 7 pages.

Terry-Jack, "NLP: Everything about Embeddings" (online) retrieved from the Internet on Nov. 29, 2019 at URL>https://medium.com/@b.terryjack/nlp-everything-about-word-embeddin . . . Total 63 pages.

Wang et al., "Extracting Search-Focused Key N-Grams for Relevance Ranking in Web Search" dated 2012, Total 10 pages.

Wikipedia, ;Word Embedding (online) retrieved from the Internet on Nov. 29, 2019, at URL>https://en.wikipedia.org/wiki/Word_embedding, Total 3 pages.

\* cited by examiner

INTERPRETING TEXT CLASSIFICATION PREDICTIONS THROUGH DETERMINISTIC EXTRACTION OF PROMINENT N-GRAMS

BACKGROUND OF THE INVENTION

1. Field of the Invention

The present invention relates to a computer program product, system, and method for interpreting text classification predictions through deterministic extraction of prominent n-grams.

2. Description of the Related Art

Text classification programs receive input text and produce a label or classifications. Users of text classification programs may view the program as a black box and may want to understand reasons driving the predictions of the text classification programs to determine whether they can trust the label or classification. Users may have more trust in the text classification program if they can identify the word or groups of words, i.e., n-grams, in the document that most likely contributed to the prediction made by the text classification program.

There are currently two major classes of approach to extract an interpretation from a text classification program prediction. One technique is to use a limited subset of machine learning algorithms which offer varying degrees of implicit interpretability (e.g., linear regression, logistic regression, or decision trees). This approach is inapplicable to both existing complex models (e.g., deep neural networks) and services whose internal models are not exposed to the user.

More sophisticated approaches to generate interpretations or explanations of classification engines repeatedly permute the input of the text to the classification model and monitor resulting changes in the output to deduce the components of the input that were most responsible for the original decision. These types of algorithms are utilized because they typically operate directly on features and are therefore generically applicable to any classification model. In the case of textual analysis, where the interpretable inputs are generally sections of natural language instead of the complex numerical representation consumed by the model (i.e., embeddings), this is usually accomplished by systematically deleting words or phrases from the input text.

One currently used algorithm is LIME (Local Interpretable Model-Agnostic Explanations), which exploits the idea that the immediate neighborhood in the feature-space surrounding any prediction made by a complex model can be approximated locally. After using the previously described permutation approach to generate and classify perturbed data using the black-box model, the LIME algorithm pairs every prediction with a more interpretable representation of each respective input (e.g., a single binary vector indicating the presence or absence of words in a document). Every pair is weighted to indicate its proximity to the original input, feature selection is performed on the interpretable representation inputs, and a simple, interpretable model is fit to the resulting data. Finally, an explanation is generated by selecting the words positionally aligned with the largest feature coefficients.

Explanations can also be extracted from text classification models using Shapley values. In game theory, Shapley values may be used to fairly divide a collective payoff achieved in a cooperative game by a coalition of players with unique skills. This can be done by finding the average marginal contribution of each player over all possible sequences. Furthermore, the net payoff from adding a given player to a coalition is independent of the order in which the coalition's earlier players were added, as well as the order in which the coalition's later players will be added. To reduce redundant computations, a player's Shapley value is typically calculated as a weighted summation of the differences in payoff resulting from adding that player to any coalition in which they have not already been added, divided by the total number of permutations of the players. The weight of each term in the summation is the number of sequences that the respective subsets represent.

Shapley values can be applied to text classification as a generic explainability algorithm by considering the algorithm's features as players in a game whose collective yield is the classifier's decision. Intuitively, by using a representation similar to the previously described interpretable format used in the LIME algorithm, it is possible to generate a Shapley value for every word in a text document and achieve an explanation by sorting the results.

There is a need in the art for improved techniques for extracting explanations from a text classification model to determine the input text instances in a document that are most likely to contribute to the predictions of the text classification model when the model itself is inaccessible.

SUMMARY

Provided are a computer program product, system, and method for interpreting text classification predictions through deterministic extraction of prominent n-grams. A determination is made of n-gram vectors comprising word embeddings of n-grams in a document and of a document vector comprising word embeddings of the document. A label is received from the text classifier program, comprising a text classification of the document. A determination is made of a label vector comprising word embeddings of the label. The n-gram vectors, the document vector, and the label vector are used to determine n-grams that explain the text classification of the text classifier program.

DETAILED DESCRIPTION

Figure 1:
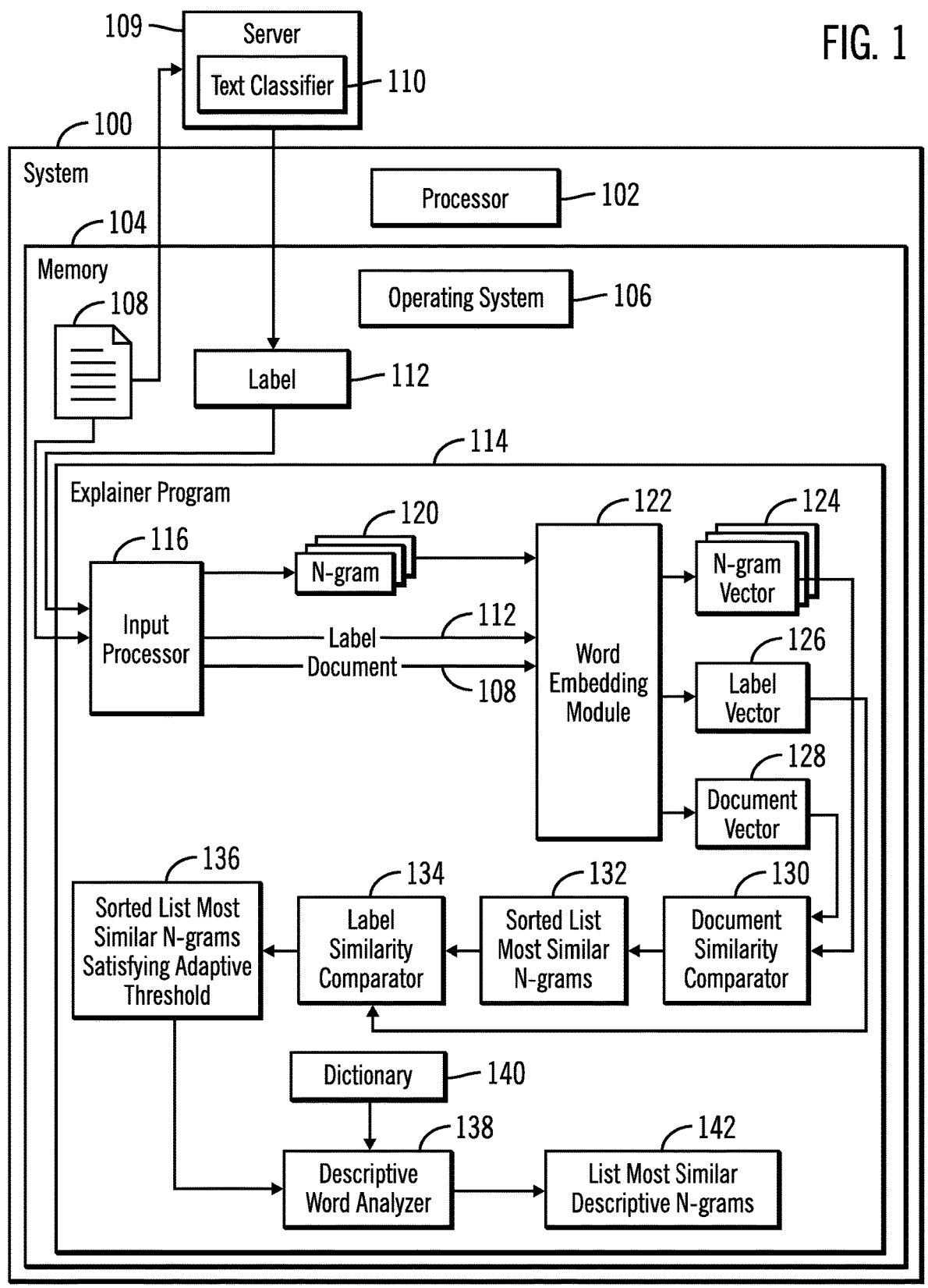
FIG. 1 illustrates an embodiment of a system having to interpret text classification predictions from a text classifier.

Described embodiments provide improvements to computer technology for determining input or text that is most likely to have contributed to a prediction or classification made by a natural language processing (NLP) system, such as a text classifier.

Existing methods for extracting explanations from classification systems usually require the use of a model with some degree of inherent interpretability or the ability to fetch predictions for many permutations of a single input to observe how feature manipulation affects the associated black-boxed output. These type of prediction models work well in closed environments, such as environments testing the classification model, where the details of the model are known, and precision and recall are considered more carefully than inference speed. However, in the production case of closed-source text classification services, where no information about the underlying algorithmic architecture is published, cost is often incurred on a per-request basis to the text classification model, factors such as latency and scalability make current approaches impractical.

Although LIME can produce strong explanations and is model-agnostic, it requires unlimited access to the model, and classifying the permuted inputs requires additional time and cost, especially if the input text is large. The computation complexity associated with evaluating each permutation is also a function of the complexity of the text classification model, which may be significant for deep learning models like deep bidirectional long short-term memory networks. This effect is further compounded when the targeted service's Application Programming Interfaces (APIs) do not allow for batch evaluation. Additionally, LIME is non-deterministic and requires tuning non-trivial parameters, such as the exact definition of a neighborhood in the feature space, the number of features to be selected for fitting the interpretable classifier, and the type of model to be used for local approximation. Finally, the typical alternative representation that LIME considers for text does not consider n-grams and represents every word as an independent feature, which weakens its effectiveness for natural language understanding problems.

Use of Shapley values suffers from most of the same model probing and complexity disadvantages outlined by the analysis provided for LIME. In fact, fully computing Shapley values is often computationally infeasible due to the high number of coalitions that need to be considered, and methods for approximating the Shapley values make the algorithm non-deterministic.

In addition to the previously described complexity and model probing disadvantages that typically accompany prior art solutions that couple the text classification model and the explainability algorithm, another disadvantage is if the text classification model is deprecated or deleted, the means of obtaining an explanation is lost.

The described embodiments avoid the drawbacks of the prior art explainability algorithms by providing a decoupling between a textual language model and the interpretability algorithm. Described embodiments provide technology for quickly generating a deterministic explanation for any input/prediction pair without any model probing by projecting the input and corresponding prediction of the system into a same embedding space for comparisons.

The described embodiments generate explanations for select natural language understanding problems in such a way that machine learning and explainability are decoupled. The described embodiments offer several advantages, including: (1) end-users save money because the proposed explainability embodiments do not require additional requests for probing a misbehaving model (2) the explainability algorithm is highly efficient and no longer tied to the time complexity of the text classification program (3) the generated explanations are deterministic, and (4) the proposed approach is non-parametric.

FIG. 1 illustrates an embodiment of a computer system 100 in which embodiments are implemented. The system 100 includes a processor 102 and a main memory 104. The main memory 104 includes various program components and data, including: an operating system 106; a document 108 comprised of text that is provided to a text classifier 110 in a server 109 to produce a label/labels providing a classification of the document 108; and an explainer program 114 to determine n-grams from the document 108 that are most likely to have contributed to a prediction or label(s) 112 generated by a text classifier 110. The text classifier 110 may also provide hierarchical classifications or a ranked list of text classifications/labels.

In the embodiment of FIG. 1, the text classifier 110 is as in a server 109 separate from the system 100 that supplies labels to the system 100 for documents 108 provided by the system 100. In this way, the text classifier 110 runs as a separate system 109, such as in a cloud computing environment or a Software as a Service (SaaS) environment, and the system 100 provides input to the remote text classifier 110 system or service. The remote classifier 110 returns the label 112. In this way, the explainer program 114 and operability are decoupled from the text classifier 110 being explained. The explainer program 114 does not need access to the text classifier 110 to extract prominent/relevant n-grams. In an alternative embodiment, the text classifier 110 may be included and run in the system 100.

The text classifier 110 may comprise an NLP or Natural Language Understanding (NLU) program that uses machine learning algorithms to classify text. In further embodiments, the text classifier 110 may be based on non-machine learning algorithms.

The explainer program 114 includes an input processor 116 to receive as input the document 108 and the label 112 output of the text classifier 110. The input processor 116 processes the document 108 to compute n-grams 120 comprising all unique words and phrases in the document 108. The input processor 116 provides the N-grams 120, the received label 112 and the document 108 to a word embedding module 122 that subjects each of the N-grams 120, the received label 112 and the document 108 to word embeddings to produce n-gram vectors 124, a label vector 126, and a document vector 128 providing a numerical representation of features values for the input n-grams 120, label 112, and document 108, respectively. The word embedding module 122 may be implemented as a deep neural network to produce embedded vectors from input text. In certain embodiments, the vectors 124, 126, and 128 have a same dimensionality to allow for comparison of the measurements. The word embedding module 122 may utilize word embedding algorithms such as, but not limited to, Word2vec, Glove, Explicit Semantic Analysis, etc.

The n-gram vectors 124 and document vector 128 are provided to the document similarity comparator 130 to determine degrees of similarity between each n-gram vector 124 and the document vector 128. The degree of similarity may be determined as the closeness of an n-gram vector to the document vector 128, such as a closeness of Euclidean distance or a cosine similarity. The document similarity comparator 130 outputs a sorted list 132, or subset, of the most similar n-grams, which may comprise a predetermined number of n-grams 120 having the greatest similarity based on their n-gram vectors 124. In a further embodiment, the number of outputted n-grams may also be a function of the text length of the document 108.

The sorted list of most similar n-grams 132, or first subset of n-grams, are provided to a label similarity comparator 134 to determine degrees of similarity between the n-grams 132 most similar to the document vector 128 and the label vector 126. The label similarity comparator 134 outputs a sorted list of most similar n-grams satisfying an adaptive threshold 136. The adaptive threshold may comprise a function of parameters such as document length 108, unique number of n-grams 120, length of sentences, other attributes of the document 108 text, etc. A descriptive word analyzer 138 processes the most similar n-grams 136 to return a list of n-gram phrases in textual form that are most likely to explain the output or label 112 of the text classifier 110.

The memory 104 may comprise suitable volatile or non-volatile memory devices known in the art. For instance, The memory 104 may comprise one or more memory devices volatile or non-volatile, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and Direct In-Line Memory Modules (DIMMs), NAND storage, e.g., flash memory, Solid State Drive (SSD) storage, non-volatile RAM, etc.

Generally, program modules, such as the program components 106, 110, 116, 122, 130, 134, and 138 may comprise routines, programs, objects, components, logic, data structures, and so on that perform particular tasks or implement particular abstract data types. The program components and hardware devices of the system 100 may be implemented in one or more computer systems, where if they are implemented in multiple computer systems, then the computer systems may communicate over a network.

The program components 106, 110, 116, 122, 130, 134, and 138 may be accessed by the processor 102 from the memory 104 to execute. Alternatively, some or all of the program components 106, 110, 116, 122, 130, 134, and 138 may be implemented in separate hardware devices, such as Application Specific Integrated Circuit (ASIC), Field Programmable Gate Arrays (FPGAs) and other hardware devices.

The functions described as performed by the program components 106, 110, 116, 122, 130, 134, and 138 may be implemented as program code in fewer program modules than shown or implemented as program code throughout a greater number of program modules than shown.

Certain of the components, such as the text classifier 110 and word embedding module 122 may use machine learning algorithms, such as deep learning algorithms, to process text to produce the specified output.

The arrows shown in FIG. 1 between the components in the memory 104 represent a data flow between the components.

Figure 2:
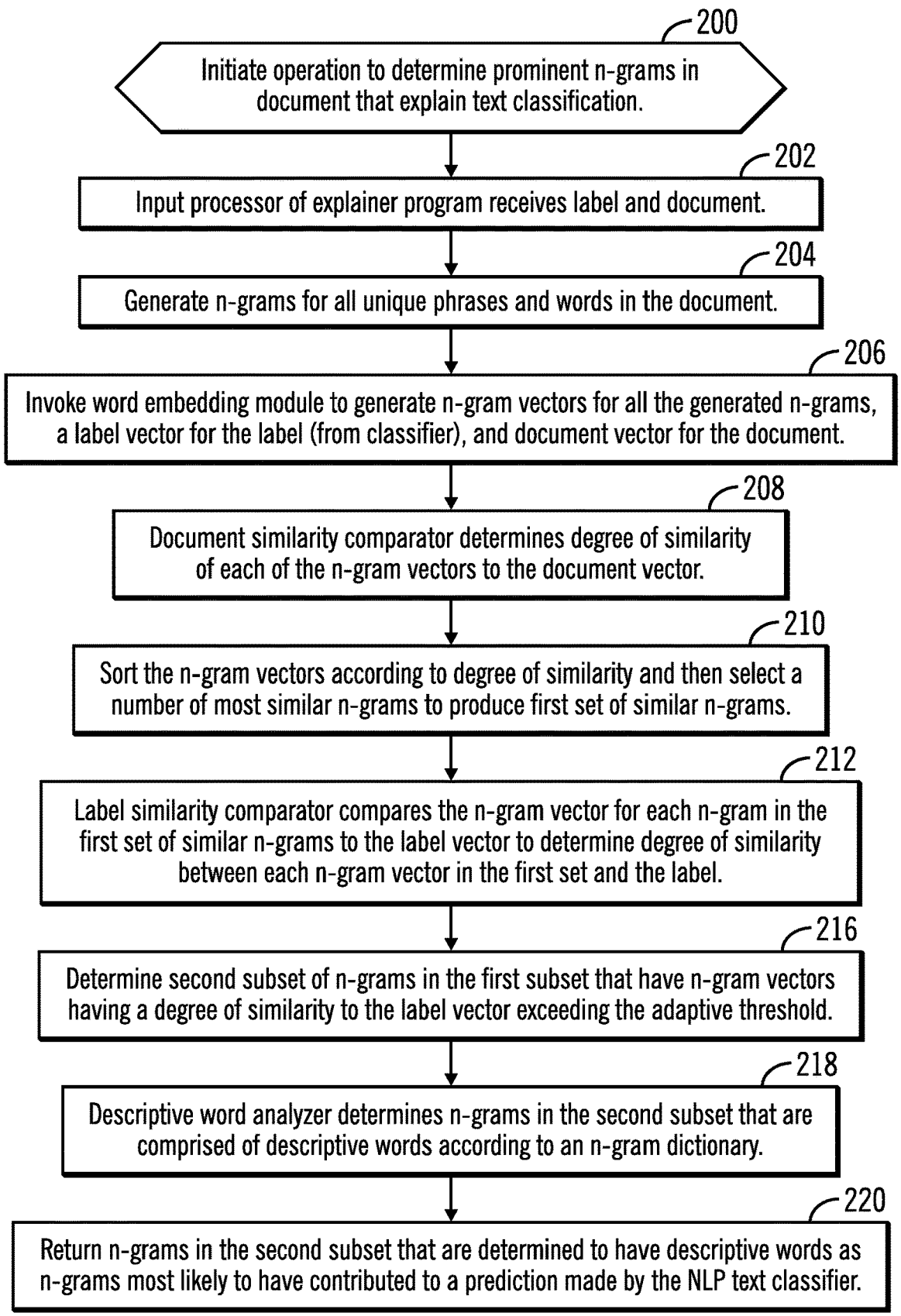
FIG. 2 illustrates an embodiment of operations to determine n-grams from a document that are most likely to have contributed to a prediction made by the text classifier.

FIG. 2 illustrates an embodiment of operations performed by the explainer program 114, including the input processor 116, word embedding module 122, document similarity comparator 130, label similarity comparator 134, and descriptive word analyzer 138 to produce n-grams from the document 108 most likely to have predictive qualities for the text classifier 110 output. Upon initiating (at block 200) an operation to determine prominent n-grams from the document 108 most likely to explain the text classification of the text classifier 110, the input processor 116 receives (at block 202) the label 112 from the classification program and the document 108 from which the label 112 is derived. As mentioned, the text classifier 110 may operate on a different system 109 than the system 100, and may be decoupled from the operations of the explainer program 114. The input processor 116 processes (at block 204) the document 108 to produce n-grams 120 comprising all unique words and phrases in the document 108.

The word embedding module generates (at block 206) n-gram vectors 124 for all the generated n-grams 120, a label vector 126 for the label (from classifier 110), and document vector 128 for the document 108. The document similarity comparator 130 determines (at block 208) a degree of similarity of each of the n-gram vectors 124 to the document vector 128, such as by comparing distance between the vectors. The n-gram vectors 124 are sorted (at block 210) according to degree of similarity and then the document similarity comparator 130 selects a number (such as a predetermined fixed number or a number that is a function of the document 108 length, number of unique n-grams, etc.) of most similar n-grams to produce a sorted list of most similar n-grams 132, or first set of similar n-grams, similar to the document vector 128. The label similarity comparator 134 compares (at block 212) the n-gram vector 124 for each n-gram in the first set of similar n-grams 132 to the label vector 126 to determine degree of similarity between the label vector 126, for each n-gram vector in the first set 132, and the label vector 126.

The label similarity comparator 134 determines (at block 216) a sorted list of most similar n-grams 136 satisfying the adaptive threshold comprising a second subset of n-grams in the first subset that have n-gram vectors having a degree of similarity to the label vector exceeding an adaptive threshold. The adaptive threshold may comprise a function of parameters such as document length 108, unique number of n-grams 120, length of sentences, other attributes of the document 108 text, etc. The descriptive word analyzer 138 uses a dictionary 140 to determine (at block 218) the n-grams 120 from the second subset 136 that are comprised of descriptive words, not just stop words, to produce the final list of most similar descriptive n-grams 142 that are most likely to have contributed to a prediction made by the NPL classifier 110.

In the embodiment of FIGS. 1 and 2, the first comparison involves the n-gram vectors 124 and the document vector 128 to produce the first subset and then the n-grams vectors for the n-grams in the first subset are compared to the label vector 126. In an alternative embodiment, the first subset may be determined by first comparing the label vector 126 to the n-gram vectors 124, and then comparing the first subset resulting from the comparison to the label vector 126 to the document vector 128 to further narrow the n-grams in the second subset. In further alternative embodiments, the n-gram vectors 124 may be compared to some combination of the label vector 126 and the document vector 128 to combine the two comparison operations into one.

The described embodiments avoid problems with prior art explainability models that have the explainability algorithm continually interact with the text classification model to determine predictive inputs. The described embodiments do not require coupling or interaction with the text classification program 110, because the explainability algorithm makes determinations of prominent n-grams based upon the label 112 received from the text classifier 110. By exploiting n-gram representations, the described embodiments achieve complete decoupling between a textual language model, such as the text classifier 110, and the explainability algorithm. The described embodiments provide a fast and deterministic explanation for any input/prediction pair without access to the text classifier 110, by projecting the input and corresponding label(s) from the text classifier 110 into a same embedding space.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
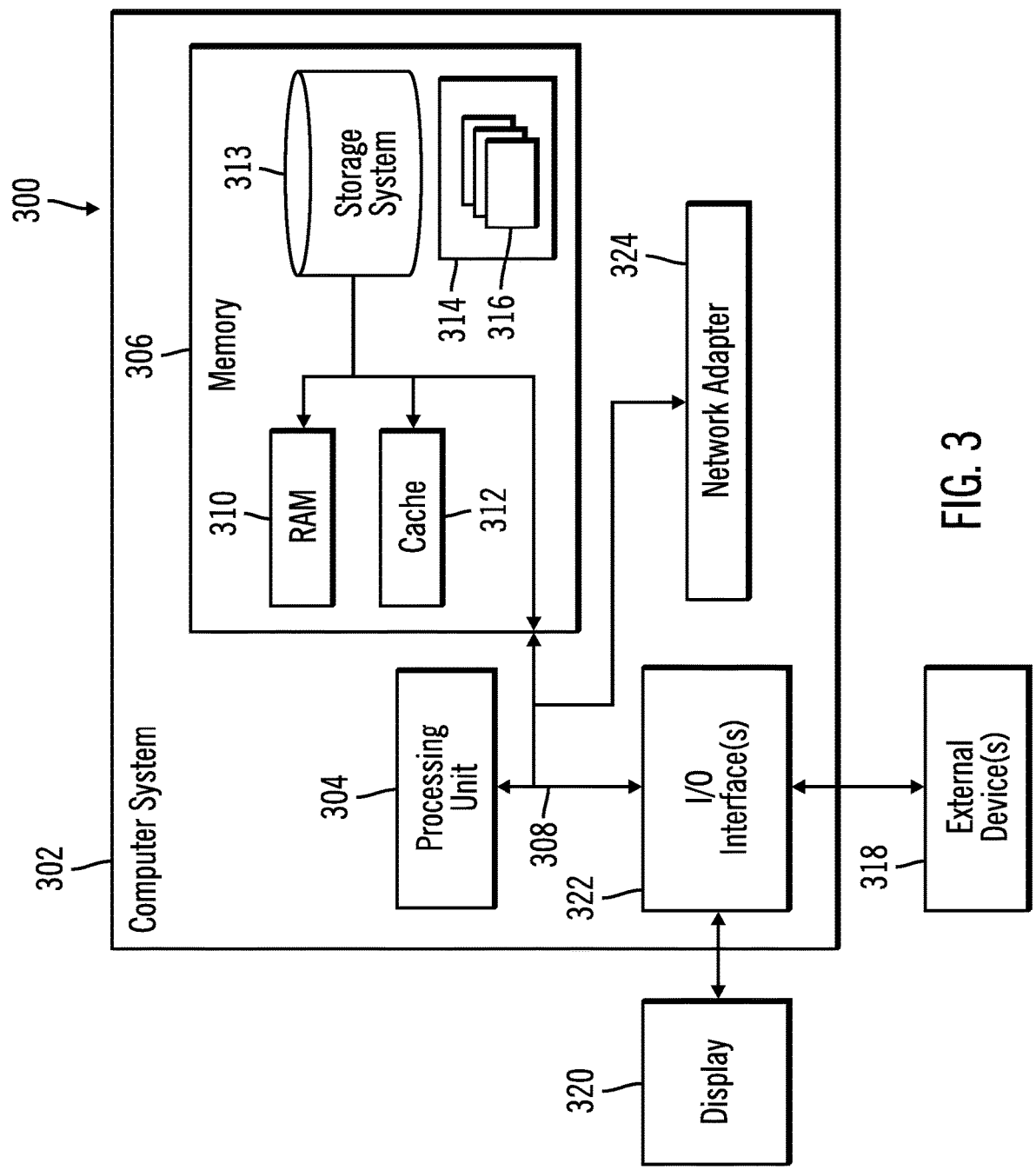
FIG. 3 illustrates a computing environment in which the components of FIG. 1 may be implemented.

The computational components of FIG. 1, including the NLP system 100 and all or some of the computational components 110, 122, 130, 134, 138 may be implemented in one or more computer systems, such as the computer system 302 shown in FIG. 3. Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the computer system/server 302 is shown in the form of a general-purpose computing device. The components of computer system/server 302 may include, but are not limited to, one or more processors or processing units 304, a system memory 306, and a bus 308 that couples various system components including system memory 306 to processor 304. Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. The components of the computer 302 may be implemented as program modules 316 which generally carry out the functions and/or methodologies of embodiments of the invention as described herein. The systems of FIG. 1 may be implemented in one or more computer systems 302, where if they are implemented in multiple computer systems 302, then the computer systems may communicate over a network.

Computer system/server 302 may also communicate with one or more external devices 318 such as a keyboard, a pointing device, a display 320, etc.; one or more devices that enable a user to interact with computer system/server 302; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for extracting explanations of predictions made by a text classifier program, wherein the computer program product comprises a computer readable storage medium having program instructions embodied therewith that when executed cause operations, the operations comprising:

determining n-gram vectors comprising word embeddings of n-grams in a document;

determining a document vector comprising word embeddings of the document;

receiving, from the text classifier program, a label comprising a text classification of the document;

determining, a label vector comprising word embeddings of the label; and using the n-gram vectors, the document vector, and the label vector to determine n-grams that explain the text classification of the text classifier program.

2. The computer program product of claim 1, wherein the using the n-gram vectors, the document vector, and the label vector comprise:

determining a first subset of the n-grams having n-gram vectors having a degree of similarity to the document vector; and using the label vector to determine a second subset of the n-grams from the first subset, wherein the n-grams in the second subset comprise the n-grams that explain predictions of the text classification of the text classifier program.

3. The computer program product of claim 2, wherein the operations further comprise:

determining whether the n-grams in the second subset of the n-grams are comprised of descriptive words according to an n-gram dictionary, wherein the second subset of n-grams comprise the n-grams in the second subset that are determined to be comprised of descriptive words.

4. The computer program product of claim 2, wherein the using the label vector to determine the second subset comprises:

comparing each of the n-gram vectors for the first subset of the n-grams to the label vector to determine the second subset of the n-gram vectors that have n-gram vectors having a greatest degree of similarity to the label vector.

5. The computer program product of claim 4, wherein the operations further comprise:

sort the second subset of the n-grams according to the degree of similarity of their n-gram vectors to the label vector, wherein the second subset of the n-grams comprises a ranked list of the n-grams.

6. The computer program product of claim 5, wherein determining the degree of similarity of the n-gram vectors to the document vector and the degree of similarity of the n-gram vectors for the first subset of the n-grams to the label vector comprises determining a closeness of the n-gram vectors to the document vector and the label vector in vector space or embedding space.

7. The computer program product of claim 4, wherein the operations further comprise:

determining whether the n-gram vectors for the second subset of the n-grams have a degree of similarity to the label vector satisfying an adaptive threshold to determine the second subset of the n-grams to explain the text classification of the text classifier program, wherein the adaptive threshold is a function of parameters comprising attribute of text in the document.

8. The computer program product of claim 7, wherein the determining the first subset of the n-grams comprises:

sorting the n-grams by the degree of similarity of their n-gram vectors to the document vector to produce a list of n-grams; and selecting a number of the sorted n-grams in the list of n-grams whose n-gram vectors have a greatest degree of similarity to the document vector to form the first subset of n-grams.

9. The computer program product of claim 1, wherein a same embedding algorithm is used to determine the n-gram vectors, the document vector, and the label vector, and wherein the n-gram vectors, the document vector, and the label vector have a same dimensionality to allow for comparisons among the n-gram vectors, the document vector, and the label vector.

10. The computer program product of claim 1, wherein the determined n-grams of the document comprise all unique words and unique phrases in the document.

11. A system for extracting explanations of predictions made by a text classifier program, comprising:

a processor; and a computer readable storage medium having program instructions embodied therewith that when executed by the processor cause operations, the operations comprising:

determining n-gram vectors comprising word embeddings of n-grams in a document;

determining a document vector comprising word embeddings of the document;

receiving, from the text classifier program, a label comprising a text classification of the document;

determining, a label vector comprising word embeddings of the label; and using the n-gram vectors, the document vector, and the label vector to determine n-grams that explain the text classification of the text classifier program.

12. The system of claim 11, wherein the using the n-gram vectors, the document vector, and the label vector comprise:

determining a first subset of the n-grams having n-gram vectors having a degree of similarity to the document vector; and using the label vector to determine a second subset of the n-grams from the first subset, wherein the n-grams in the second subset comprise the n-grams that explain predictions of the text classification of the text classifier program.

13. The system of claim 12, wherein the using the label vector to determine the second subset comprises:

comparing each of the n-gram vectors for the first subset of the n-grams to the label vector to determine the second subset of the n-gram vectors that have n-gram vectors having a greatest degree of similarity to the label vector.

14. The system of claim 13, wherein the operations further comprise:

determining whether the n-gram vectors for the second subset of the n-grams have a degree of similarity to the label vector satisfying an adaptive threshold to determine the second subset of the n-grams to explain the text classification of the text classifier program, wherein the adaptive threshold is a function of parameters comprising attribute of text in the document.

15. The system of claim 11, wherein a same embedding algorithm is used to determine the n-gram vectors, the document vector, and the label vector, and wherein the n-gram vectors, the document vector, and the label vector have a same dimensionality to allow for comparisons among the n-gram vectors, the document vector, and the label vector.

16. A method for extracting explanations of predictions made by a text classifier program, comprising:
- determining n-gram vectors comprising word embeddings of n-grams in a document;
- determining a document vector comprising word embeddings of the document;
- receiving, from the text classifier program, a label comprising a text classification of the document;
- determining, a label vector comprising word embeddings of the label; and
- using the n-gram vectors, the document vector, and the label vector to determine n-grams that explain the text classification of the text classifier program.

17. The method of claim 16, wherein the using the n-gram vectors, the document vector, and the label vector comprise:
- determining a first subset of the n-grams having n-gram vectors having a degree of similarity to the document vector; and
- using the label vector to determine a second subset of the n-grams from the first subset, wherein the n-grams in the second subset comprise the n-grams that explain predictions of the text classification of the text classifier program.

18. The method of claim 17, wherein the using the label vector to determine the second subset comprises:
- comparing each of the n-gram vectors for the first subset of the n-grams to the label vector to determine the second subset of the n-gram vectors that have n-gram vectors having a greatest degree of similarity to the label vector.

19. The method of claim 16, further comprising:
- determining whether the n-gram vectors for the second subset of the n-grams have a degree of similarity to the label vector satisfying an adaptive threshold to determine the second subset of the n-grams to explain the text classification of the text classifier program, wherein the adaptive threshold is a function of parameters comprising attribute of text in the document.

20. The method of claim 16, wherein a same embedding algorithm is used to determine the n-gram vectors, the document vector, and the label vector, and wherein the n-gram vectors, the document vector, and the label vector have a same dimensionality to allow for comparisons among the n-gram vectors, the document vector, and the label vector.

* * * * *